US011308057B2

(12) United States Patent
Havlir et al.

(10) Patent No.: US 11,308,057 B2
(45) Date of Patent: Apr. 19, 2022

(54) SYSTEM AND METHOD FOR MULTIPLEXER TREE INDEXING

(71) Applicant: Advanced Micro Devices, Inc., Santa Clara, CA (US)

(72) Inventors: Steven R. Havlir, Austin, TX (US); Patrick J. Shyvers, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 481 days.

(21) Appl. No.: 15/824,771

(22) Filed: Nov. 28, 2017

(65) Prior Publication Data

US 2018/0165314 A1 Jun. 14, 2018

Related U.S. Application Data

(60) Provisional application No. 62/432,815, filed on Dec. 12, 2016.

(51) Int. Cl.
*G06F 16/22* (2019.01)
*G06F 9/38* (2018.01)

(52) U.S. Cl.
CPC ...... *G06F 16/2264* (2019.01); *G06F 16/2246* (2019.01); *G06F 16/2255* (2019.01); *G06F 9/3844* (2013.01)

(58) Field of Classification Search
CPC ............. G06F 16/2264; G06F 16/2246; G06F 16/2255; G06F 9/3844
See application file for complete search history.

(56) References Cited

U.S. PATENT DOCUMENTS

| 5,770,894 | A | * | 6/1998 | Agarwal | G06F 9/3842 712/215 |
|---|---|---|---|---|---|
| 6,625,612 | B1 | * | 9/2003 | Tal | G06F 16/9014 |
| 6,795,889 | B2 | * | 9/2004 | Berg | G11C 7/1006 365/189.02 |
| 7,170,891 | B2 | * | 1/2007 | Messenger | H04L 45/00 370/392 |
| 7,234,019 | B1 | | 6/2007 | Kao et al. | |
| 7,464,229 | B1 | * | 12/2008 | Jones | G11C 7/1075 711/154 |
| 9,047,329 | B1 | | 6/2015 | Tyson | |
| 2002/0129086 | A1 | * | 9/2002 | Garcia-Luna-Aceves | H04L 45/00 709/200 |
| 2003/0103626 | A1 | * | 6/2003 | Stein | H04L 9/0625 380/42 |
| 2005/0078601 | A1 | * | 4/2005 | Moll | H04L 45/00 370/218 |

(Continued)

OTHER PUBLICATIONS

International Search Report dated Mar. 20, 2018.

*Primary Examiner* — Kris E Mackes
*Assistant Examiner* — Tiffany Thuy Bui
(74) *Attorney, Agent, or Firm* — Volpe Koenig

(57) ABSTRACT

Described herein is a system and method for multiplexer tree (muxtree) indexing. Muxtree indexing performs hashing and row reduction in parallel by use of each select bit only once in a particular path of the muxtree. The muxtree indexing generates a different final index as compared to conventional hashed indexing but still results in a fair hash, where all table entries get used with equal distribution with uniformly random selects.

18 Claims, 12 Drawing Sheets

(56) References Cited

U.S. PATENT DOCUMENTS

| | | |
|---|---|---|
| 2005/0174144 A1* | 8/2005 | Veredas-Ramirez ........................ G11C 7/1012 326/38 |
| 2007/0222477 A1 | 9/2007 | Lewis et al. |
| 2009/0100055 A1* | 4/2009 | Wang ...................... G06F 16/28 |
| 2009/0204798 A1 | 8/2009 | Alexander et al. |
| 2012/0124589 A1* | 5/2012 | Rupley ..................... G06F 9/46 718/103 |
| 2012/0198267 A1* | 8/2012 | Das ..................... G06F 13/1605 713/600 |
| 2013/0205123 A1* | 8/2013 | Vorbach .............. G06F 9/30043 712/221 |
| 2015/0161033 A1 | 6/2015 | Goel et al. |
| 2016/0202983 A1* | 7/2016 | Lin ....................... G06F 9/3802 712/225 |
| 2018/0107759 A1* | 4/2018 | Cheng ............... G06F 16/24532 |

* cited by examiner

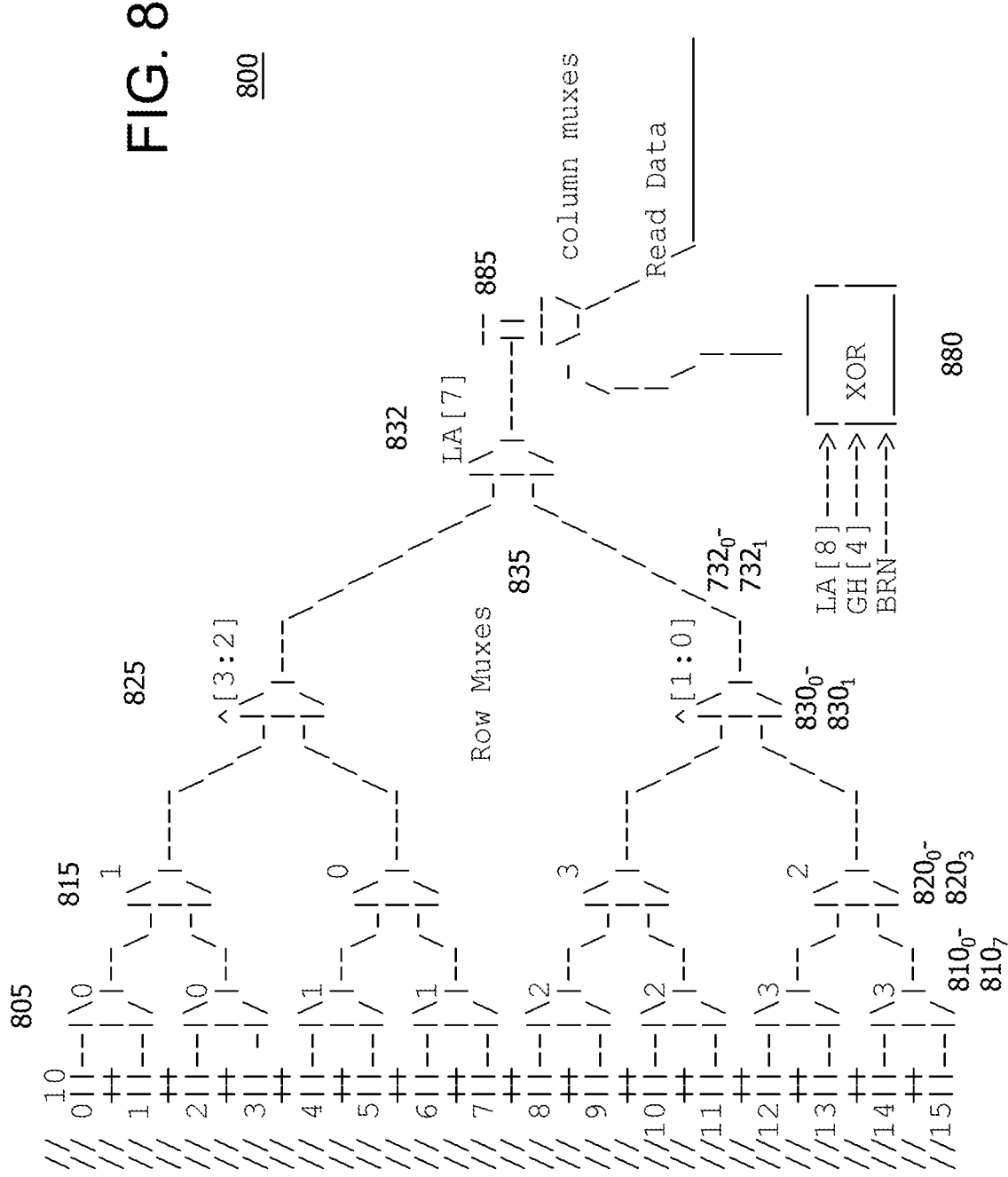

SYSTEM AND METHOD FOR MULTIPLEXER TREE INDEXING

CROSS REFERENCE TO RELATED APPLICATION

This application claims the benefit of U.S. provisional application No. 62/432,815 filed Dec. 12, 2016, which is incorporated by reference as if fully set forth.

BACKGROUND

In a processing system, accesses are made to tables implemented in storage media to read and write information such as data and/or instructions, for example. The tables are generally defined as an array of rows and columns, where each row and column intersection represents a storage element. Indices are used to access into the table. For example, a particular index can be characterized by information stored in a particular column. With the ever increasing volume of data that needs to stored, the length of the indices and therefore the time required to perform a read access, due to searching and matching a particular index, also increases.

A hashing function can be used to increase entropy in the indexing of a structure. This is particularly helpful where the number of address bits that may be used to index the structure is large and creating a data structure of size $2n$ is not feasible. Hashed indexing, however, has other performance issues. In particular, traditional hashed indexing is a serial process where each hash level has to be completed in sequence before determining a final index. Also, there is a pinch point where all the selects come together, get processed by decode logic and then commence a huge fan-out to all of the entries in the table.

BRIEF DESCRIPTION OF THE DRAWINGS

A more detailed understanding may be had from the following description, given by way of example in conjunction with the accompanying drawings wherein:

FIG. 8 is a diagram that illustrates another multiplexer tree indexing scheme which contains 16 rows and uses each select bit twice in the first level in accordance with certain implementations.

DETAILED DESCRIPTION

Figure 1:
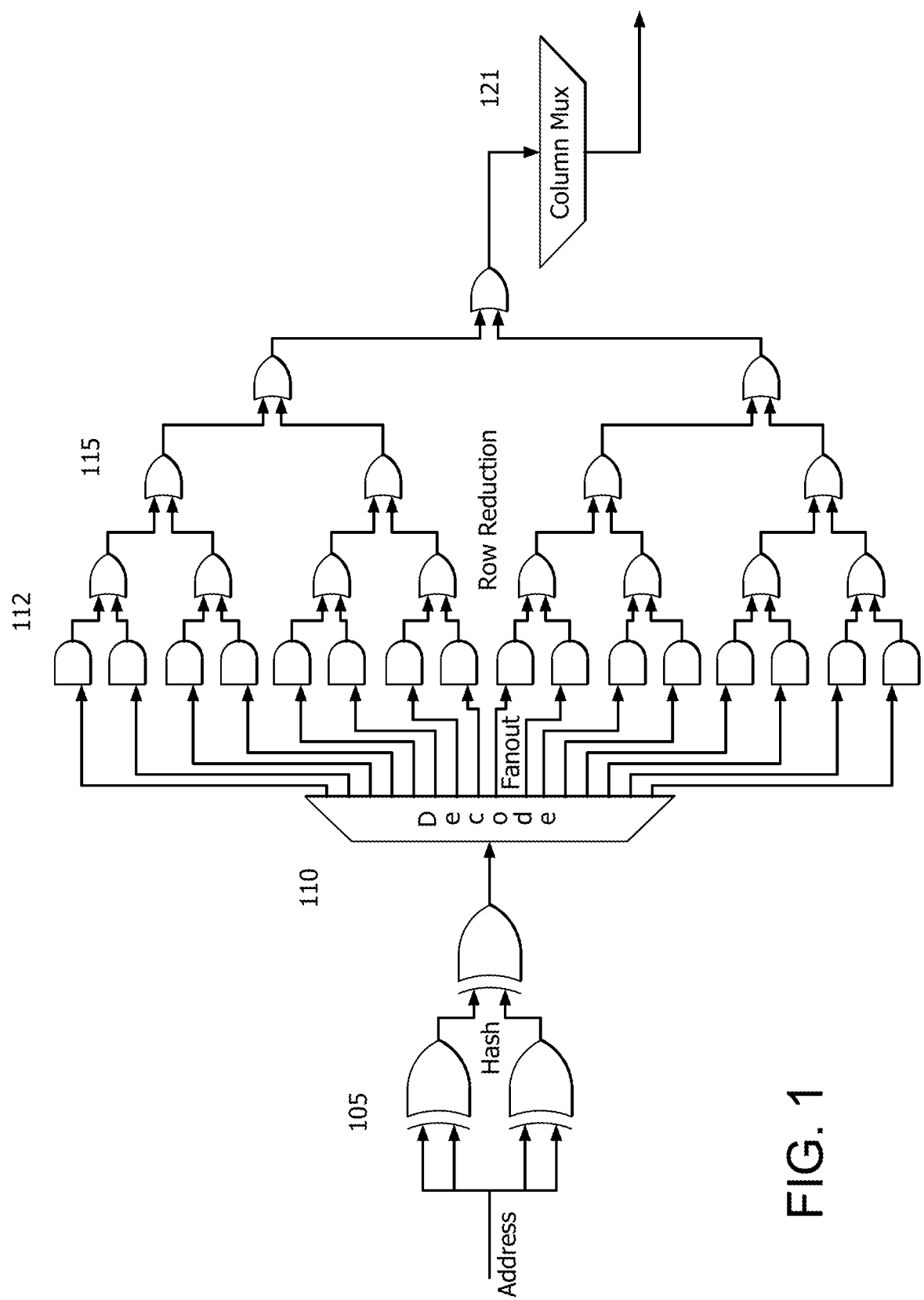
FIG. 1 is a block diagram of a conventional hashed indexing logic.

FIG. 1 illustrates a conventional hashed indexing logic 100. Hashed indexing logic 100 intakes an address and generates an address hash using exclusive OR (XOR) logic gates 105. This address hash generation is a serial process and results in a pinch point prior to decode logic 110. Decode logic 110 decodes address hash and feeds AND logic gates 112. The second input (not drawn) to each AND logic gate 112 is the data of a row from the storage structure. AND logic gates 112 feed OR logic gates 115 to perform row reduction, which in turn feeds an optional column multiplexer 121 for column reduction.

Described herein is a system and method for multiplexer tree (muxtree) indexing. In general, muxtree indexing performs index hashing and row reduction in parallel. This is enabled by using each address bit in a lookup address as a select bit only once in a particular path of the muxtree. The muxtree attempts to use as many of the address bits as possible without repeating use of an address bit as a particular row is traversed from start to finish. That is, by using different bits at each multiplexer level, parallel computation can be done that avoids the pinch point followed by fan-out issue. In addition, by performing the hashing and selection/reduction in parallel, there are fewer logic levels to go from start to finish.

In general, the lookup address can include one or more items such as, but not limited to, branch global history (Ghist), linear address, physical address, thread identifier, page attributes such as privilege level, or a pointer obtained from a lookup from another structure. The chosen lookup address scheme should ensure that the select bits are able to address the entire structure without causing negative effects such as entry collisions and set contention. The muxtree indexing generates a different final index as compared to conventional hashed indexing but still results in a fair hash, where all table entries get used with equal distribution with uniformly random selects.

Consequently, the muxtree indexing overcomes at least the need for decode logic 110, and avoids the issue of having a pinch point followed by huge fan-out as employed in conventional hashed indexing logic 100.

The muxtree indexing logic and method is described in terms of branch prediction but is applicable to any use case where tables are accessed in storage media. For example, the method and system are applicable anywhere a cache is used.

In a microprocessor, instructions are fetched for execution sequentially until a branch occurs. A branch causes a change in the address from which instructions are fetched and may be associated with delays in instruction fetch throughput. For example, branches may need to be evaluated to determine whether to take the branch as well as what the branch destination is. However, branches cannot be evaluated until the branch has actually entered the instruction execution pipeline. Branch delays are associated with the difference between the time that the branch is fetched and the time that the branch is evaluated to determine the outcome of that branch and thus what instructions need to be fetched next.

Branch prediction helps to mitigate this delay by predicting the existence and outcome of a branch instruction based upon instruction address and on branch evaluation history. Branch prediction techniques may use a global history (Ghist) of branch conditional decisions (e.g., taken or not-taken), and the current program counter value to make a prediction of whether a branch exists and whether that branch should be taken. The Ghist is a pattern of past behavior and predictor of future behavior. A branch target buffer stores information that associates program counter addresses (or linear addresses) with branch targets. The existence of an entry in the branch target buffer implicitly indicates that a branch exists at the program counter associated with that entry. A branch predictor can use the Ghist and branch target buffer data to make branch prediction decisions. Because of the delays associated with branch instructions, efficient and fast access to the branch target buffer data is important in microprocessor design.

Figure 2:
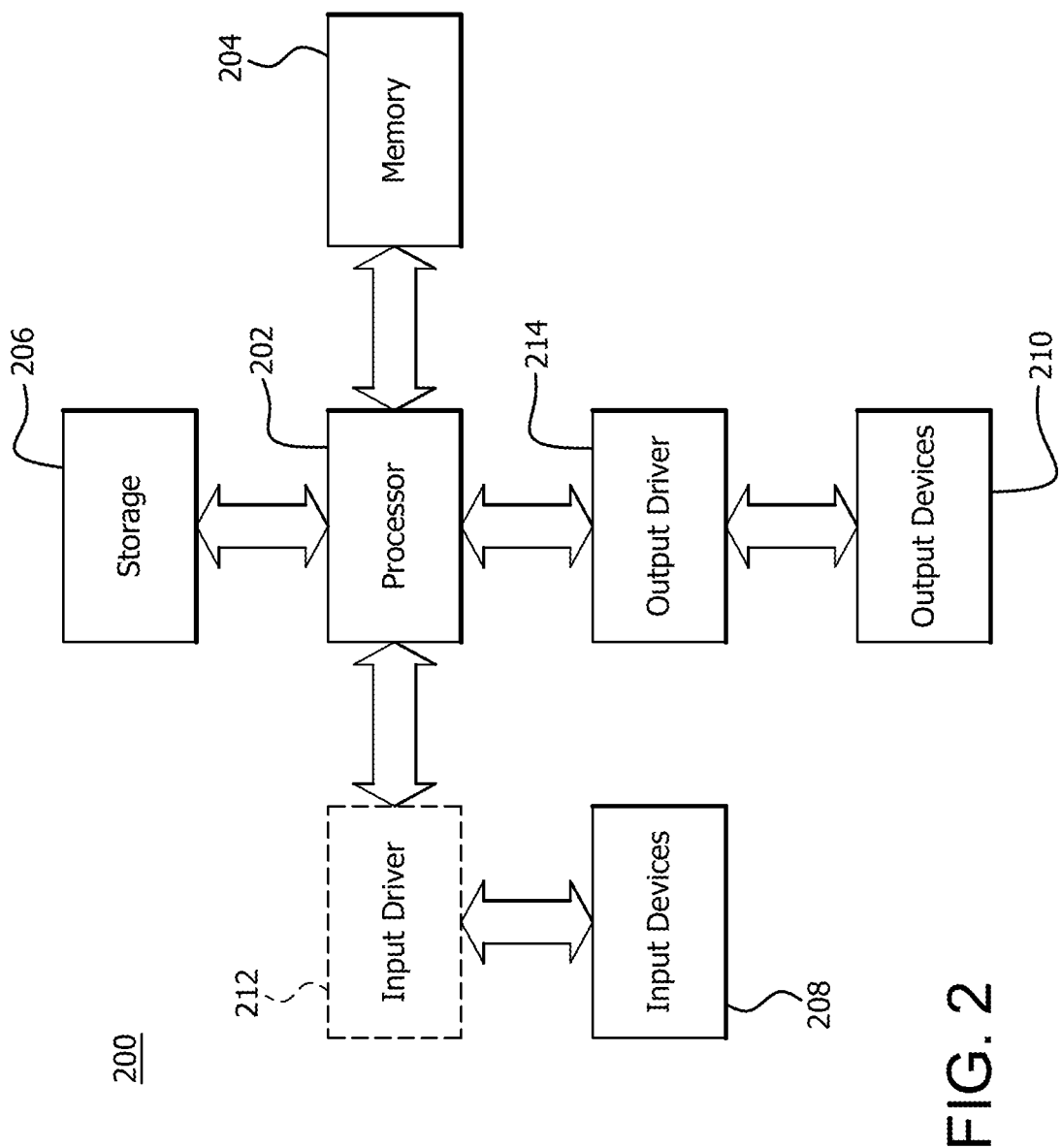
FIG. 2 is a block diagram of an example device in which one or more disclosed embodiments may be implemented.

FIG. 2 is a block diagram of an example device 200 in which aspects of the present disclosure are implemented. Device 200 includes, for example, a computer, a gaming device, a handheld device, a set-top box, a television, a mobile phone, or a tablet computer. Device 200 includes a processor 202, a memory 204, a storage device 206, one or more input devices 208, and one or more output devices 210. Device 200 may also optionally include an input driver 212 and an output driver 214. It is understood that device 200 may include additional components not shown in FIG. 2.

Processor 202 includes a central processing unit (CPU), a graphics processing unit (GPU), a CPU and GPU located on the same die, or one or more processor cores, wherein each processor core is a CPU or a GPU. Memory 204 may be located on the same die as processor 202, or may be located separately from processor 202. Memory 204 includes a volatile or non-volatile memory, for example, random access memory (RAM), dynamic RAM, or a cache.

Storage device 206 includes a fixed or removable storage, for example, a hard disk drive, a solid state drive, an optical disk, or a flash drive. Input devices 208 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Output devices 210 include a display, a speaker, a printer, a haptic feedback device, one or more lights, an antenna, or a network connection (e.g., a wireless local area network card for transmission and/or reception of wireless IEEE 802 signals).

Input driver 212 communicates with processor 202 and input devices 208, and permits processor 202 to receive input from input devices 208. Output driver 214 communicates with processor 202 and output devices 210, and permits processor 202 to send output to output devices 210. It is noted that input driver 212 and output driver 214 are optional components, and that device 200 will operate in the same manner if input driver 212 and output driver 214 are not present.

Figure 3:
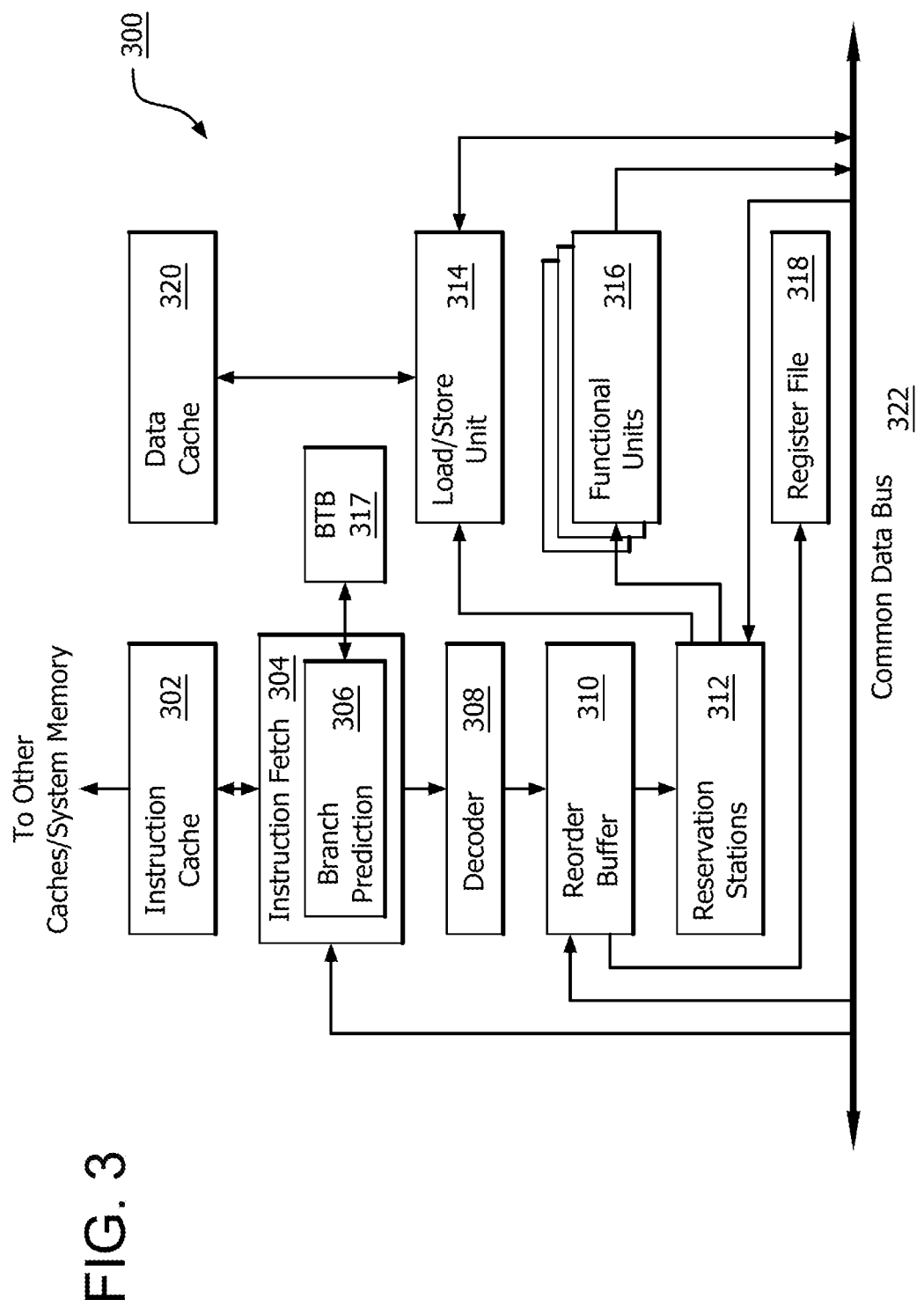
FIG. 3 is a block diagram of an instruction execution pipeline, located within the processor of FIG. 1 in accordance with certain implementations.

FIG. 3 is a block diagram of an instruction execution pipeline 300, located within processor 202 of FIG. 2. Instruction execution pipeline 300 retrieves instructions from memory and executes the instructions, outputting data to memory and modifying the state of elements within instruction execution pipeline 300, such as registers within register file 318.

Instruction execution pipeline 300 includes an instruction fetch unit 304 configured to fetch instructions from system memory (such as memory 104) via an instruction cache 302, a decoder 308 configured to decode fetched instructions, functional units 316 configured to perform calculations to process the instructions, a load store unit 314, configured to load data from or store data to system memory via a data cache 320, and a register file 318, which includes registers that store working data for the instructions. A reorder buffer 310 tracks instructions that are currently in-flight and ensures in-order retirement of instructions despite allowing out-of-order execution while in-flight. "In-flight" instructions refers to instructions that have been received by reorder buffer 310 but have not yet had results committed to the architectural state of the processor (e.g., results written to a register file, or the like). Reservation stations 312 maintain in-flight instructions and track instruction operands. When all operands are ready for execution of a particular instruction, reservation stations 312 send the instruction to a functional unit 316 or a load/store unit 314 for execution. Completed instructions are marked for retirement in reorder buffer 310 and are retired when at the head of reorder buffer queue 310. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of instruction execution pipeline 300 communicate via a common data bus 322. For example, functional units 316 and load/store unit 314 write results to common data bus 322 which may be read by reservation stations 312 for execution of dependent instructions and by reorder buffer 310 as the final processing result of an in-flight instruction that has finished execution. Load/store unit 314 also reads data from common data bus 322. For example, load/store unit 314 reads results from completed instructions from common data bus 322 and writes the results to memory via data cache 320 for store instructions.

Typically, instruction fetch unit 304 fetches instructions sequentially in memory. Sequential control flow may be interrupted by branch instructions, which causes instruction pipeline 300 to fetch instructions from a non-sequential address. Branch instructions may be conditional, causing a branch only if a particular condition is satisfied, or non-conditional, and may specify a target directly or indirectly. Direct targets are specified by constants in the instruction byte itself and indirect targets are specified by some calculation. Direct and indirect branches may be conditional or non-conditional.

Sequential fetching of instructions is relatively simple for instruction execution pipeline 300. Instruction fetch unit 304 sequentially fetches large chunks of contiguously stored instructions for execution. However, a branch instruction may interrupt such fetching for a few reasons. More specifically, depending on the type of branch instruction, any or all of the following may happen for execution of the branch instruction: instruction decoder 308 determines that the instruction is in fact a branch instruction, functional units 316 calculate a target for the branch instruction, and functional units 316 evaluate the conditional of the branch instruction. Because a delay exists between when a branch instruction is fetched and issued for execution by instruction fetch unit 304 and when the branch instruction is actually executed by instruction execution pipeline 300, the instruction fetch unit 304 includes a branch prediction unit 306.

Branch prediction unit 306 generates a branch conditional prediction (e.g., taken or not-taken) and a branch target prediction based on addresses of instructions to be fetched. Branch prediction unit 306 may use branch conditional history, maintained and manipulated via any of a variety of known techniques, as well as branch target history that correlates instruction program counters with branch target addresses. Upon detecting a predicted branch, identifying a predicted target address for the predicted branch, and predicting that the target path is taken, branch prediction unit 306 causes instruction fetch unit 304 to begin fetching instructions from the predicted target address. Branch prediction unit 306 thus helps to reduce delays that occur as the result of branch instructions.

Branch prediction unit 306 can use a global history (ghist) of branch conditional decisions (e.g., taken or not-taken), and the current program counter value to make a prediction of whether a branch exists and whether that branch should be taken. A branch target buffer (BTB) 317 stores information that associates program counter addresses (or linear addresses) with branch targets. Branch prediction unit 306 can use the global history and branch target buffer data from BTB 317 to make branch prediction decisions. Because of the delays associated with branch instructions, efficient and fast access to the branch target buffer data in BTB 317 is important in microprocessor design.

Figure 4A:
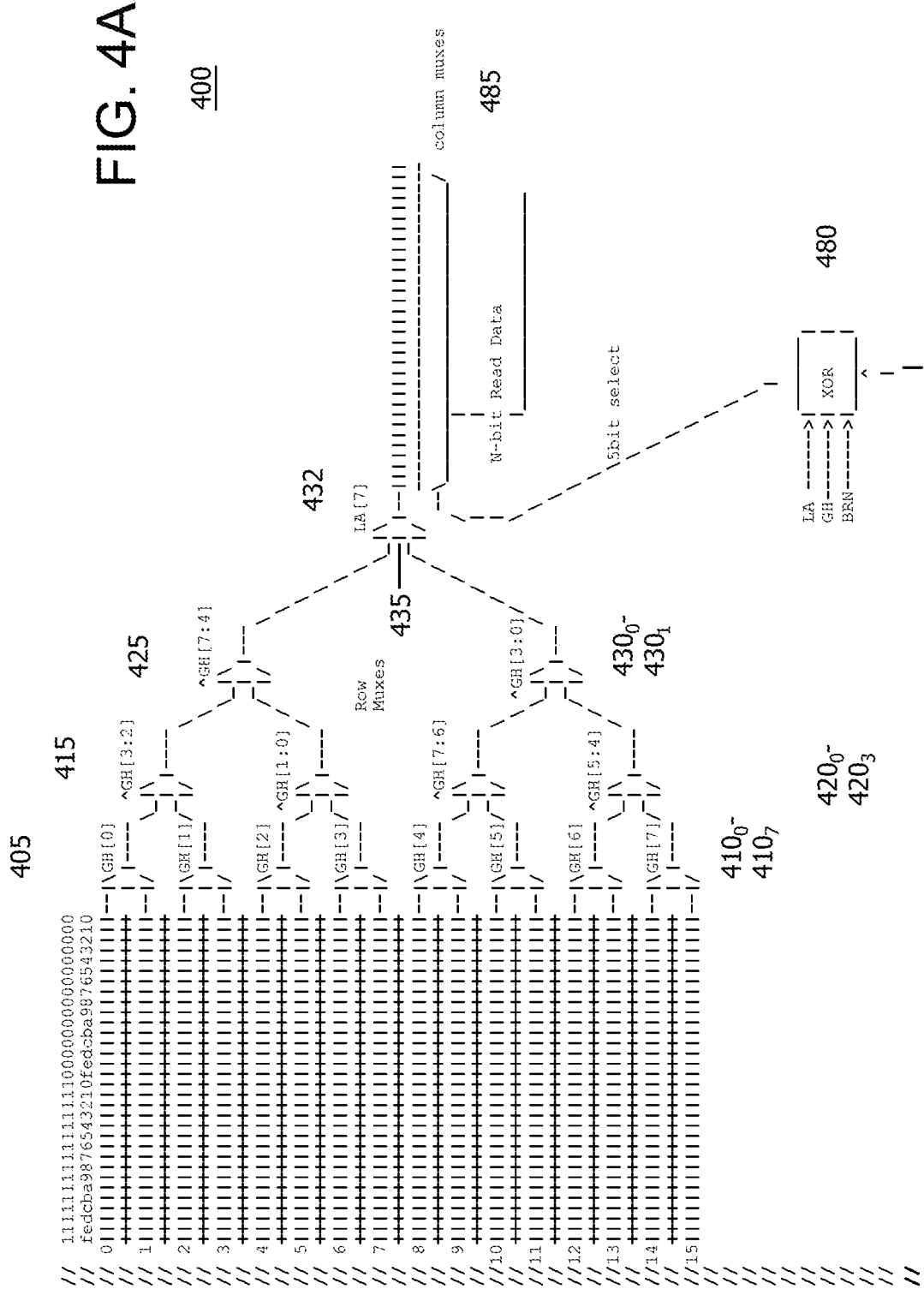
FIGS. 4A-4B are diagrams that illustrate a multiplexer tree indexing scheme which contains 16 rows and uses each select bit once in the first level in accordance with certain implementations.
Figure 4B:
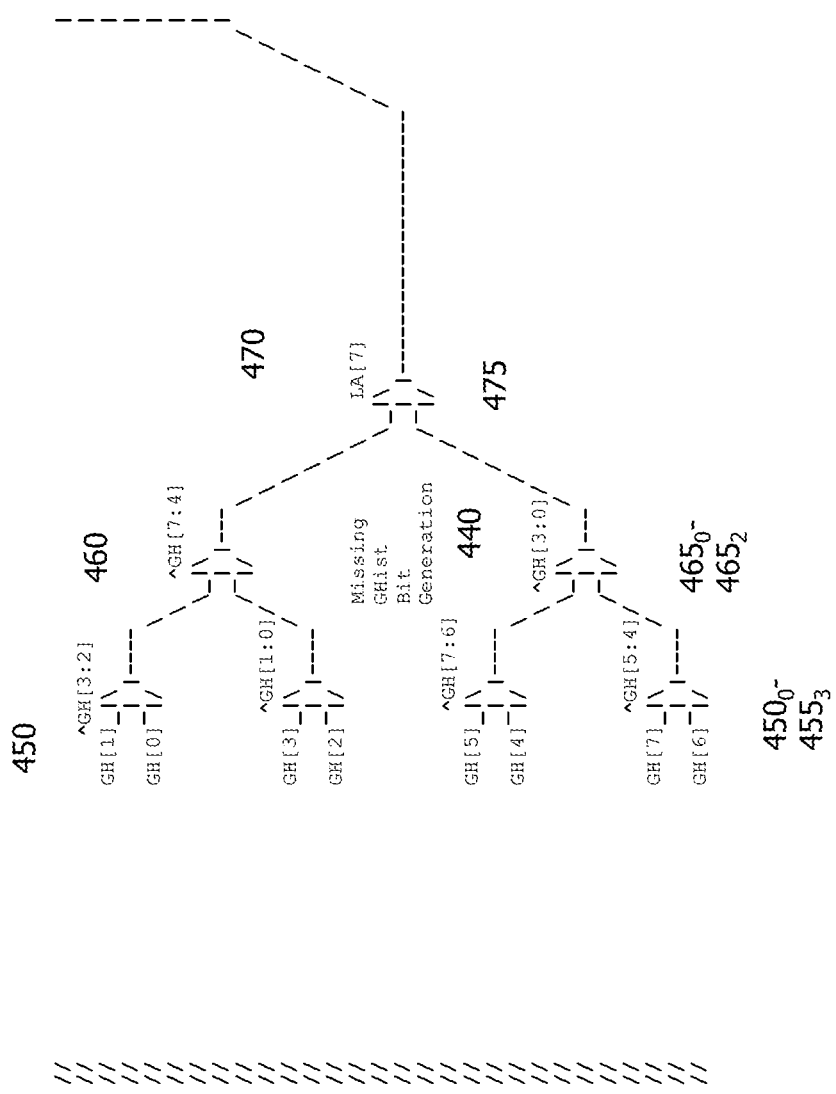

FIGS. 4A-4B are an example muxtree 400 with 16 rows which uses a combination of Ghist, a linear address (LA) and branch number as the lookup address. As noted herein, entropy in the lookup address ensures that all branches of muxtree 400 are used in a near random, distributive fashion. This works well for branch prediction as the Ghist is usually a very diverse bit sequence. In an implementation, the number of bits used from the Ghist is balanced between mitigating conflict (where the same index is generated) and aliasing (where the same index is generated and the tagging scheme is unable to differentiate between two different lookup addresses). In terms of branch prediction, this will lead to mis-prediction. The LA is used as it is representative of a specific branch. It may be considered mostly equivalent to the program counter, for example. The number of inputs in FIGS. 4A-4B is illustrative.

In this implementation, each row has 32 storage elements. In an implementation, each row can have one storage element. The number of storage elements in a row determines the number of columns. In an implementation, each storage element can store a predetermined number of bits. Each storage element requires a unique identifier to enable access to that storage element. This is nominally known as an index.

At a first level 405 of muxtree 400 there are 8 row multiplexers 410$_0$-410$_7$ and each multiplexer 410$_{0-7}$ uses a different selection bit from the lookup address. For example, each multiplexer 410$_{0-7}$ can use a different Ghist bit, for example. Each multiplexer 410$_{0-7}$ selects between a set of rows and therefore reduces the number of rows fed to the next level. In general, the number of multiplexer levels needed depends on the number of reductions needed to select an appropriate storage element. The multiplexers can be implemented using logic or gates typically used to implement such multiplexers. In an implementation, AND-OR-Invert (AOI) gates are used to implement the multiplexers.

At a second level 415 of muxtree 400 there are 4 row multiplexers 420$_0$-420$_3$ and each multiplexer 420$_{0-3}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. For example, row multiplexer 420$_0$ uses a hash of Ghist bits 3 and 2. Each multiplexer 420$_{0-3}$ selects between an already reduced set of rows and again reduces the number of rows fed to the next level.

At a third level 425 of muxtree 400 there are 2 row multiplexers 430$_0$-430$_1$ and each multiplexer 430$_{0-1}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. Each multiplexer 430$_{0-1}$ selects between an already reduced set of rows and again reduces the number of rows fed to the next level.

At a fourth level 432 of muxtree 400, a row multiplexer 435 uses a predetermined bit of LA to select the row. The predetermined bit is one that should toggle on a regular basis or quite often so that potential combinations of the remaining row appear to be selected on a random basis. If the predetermined bit is not selected properly, then only half the muxtree 400 structure will be used for indexing. The selection of the predetermined bit should optimize random usage of the entire muxtree 400 structure. For example, if it is assumed that the LA covers a $2^{64}$ byte range, then bit 63 of the LA will not toggle as much as bit 7 of the LA.

At this juncture in muxtree 400, a row has now been selected. An additional set of multiplexers and selection bits provide column input reduction and selection for structures which contain more than one column. For purposes of illustration only, this is referred to as Missing Ghist Bit Generation logic 440 since bits that were not used across a row are now used in column input selection. Missing Ghist Bit Generation logic 440 can include column multiplexers, where the number of levels depends on the number of reductions needed to select an appropriate storage element.

At a first level 450 of muxtree 400 there are 4 column multiplexers 455$_0$-455$_3$ and each multiplexer 455$_{0-3}$ uses as inputs Ghist bits which were not used in an associated row. For example, column multiplexer 455$_0$ uses Ghist bits 0 and 1 as inputs. Each multiplexer 455$_{0-3}$ uses the hashed selection bits from the corresponding row multiplexer operation. For example, column multiplexer 455$_0$ uses a hash of Ghist bits 3 and 2 similar to row multiplexer 420$_0$. Each multiplexer 455$_{0-3}$ selects and reduces the number of Ghist bits fed to the next level.

At a second level 460 of muxtree 400 there are 2 column multiplexers 465$_0$-465$_1$ and each multiplexer 465$_{0-4}$ uses the hashed selection bits from the corresponding row multiplexer operation as before. For example, column multiplexer 455$_0$ uses a hash of Ghist bits 3 and 2 similar to row multiplexer 420$_0$. Each multiplexer 455$_{0-1}$ selects between an already reduced set of columns and again reduces the number of Ghist bits fed to the next level.

At a third column level 470 of muxtree 400, a column multiplexer 475 uses the same predetermined bit of LA to select the column. In an implementation, a different predetermined bit can be used that also toggles on a regular basis or quite often so that potential combinations of the remaining column appear to be selected on a random basis.

In an implementation where there is more than one column, the output of column multiplexer 475 is an input to a XOR logic gate 480 along with other inputs which could include, for example, LA, Ghist and branch number. These other inputs are included to provide variability in the index. For example, in line with the theme of not repeating bits, unused bits from the Ghist and LA can be used.

A predetermined number of selects from XOR logic gate 480 are output to a column multiplexer 485 that acts as a column input select into the previously selected row. This determines the particular storage element.

As a result of non-repeating use of the bits in the lookup address, row multiplexers 410$_0$-410$_7$, row multiplexers $420_0$-$420_3$, row multiplexers $430_0$-$430_1$, missing Ghist multiplexers $455_0$-$455_3$, missing Ghist multiplexers $465_0$-$465_1$ and missing Ghist multiplexer 475 can perform select hashing and reduction in parallel. As noted herein, Missing Ghist Bit Generation logic 440 is applicable when there are multiple columns in a row.

Figure 5A:
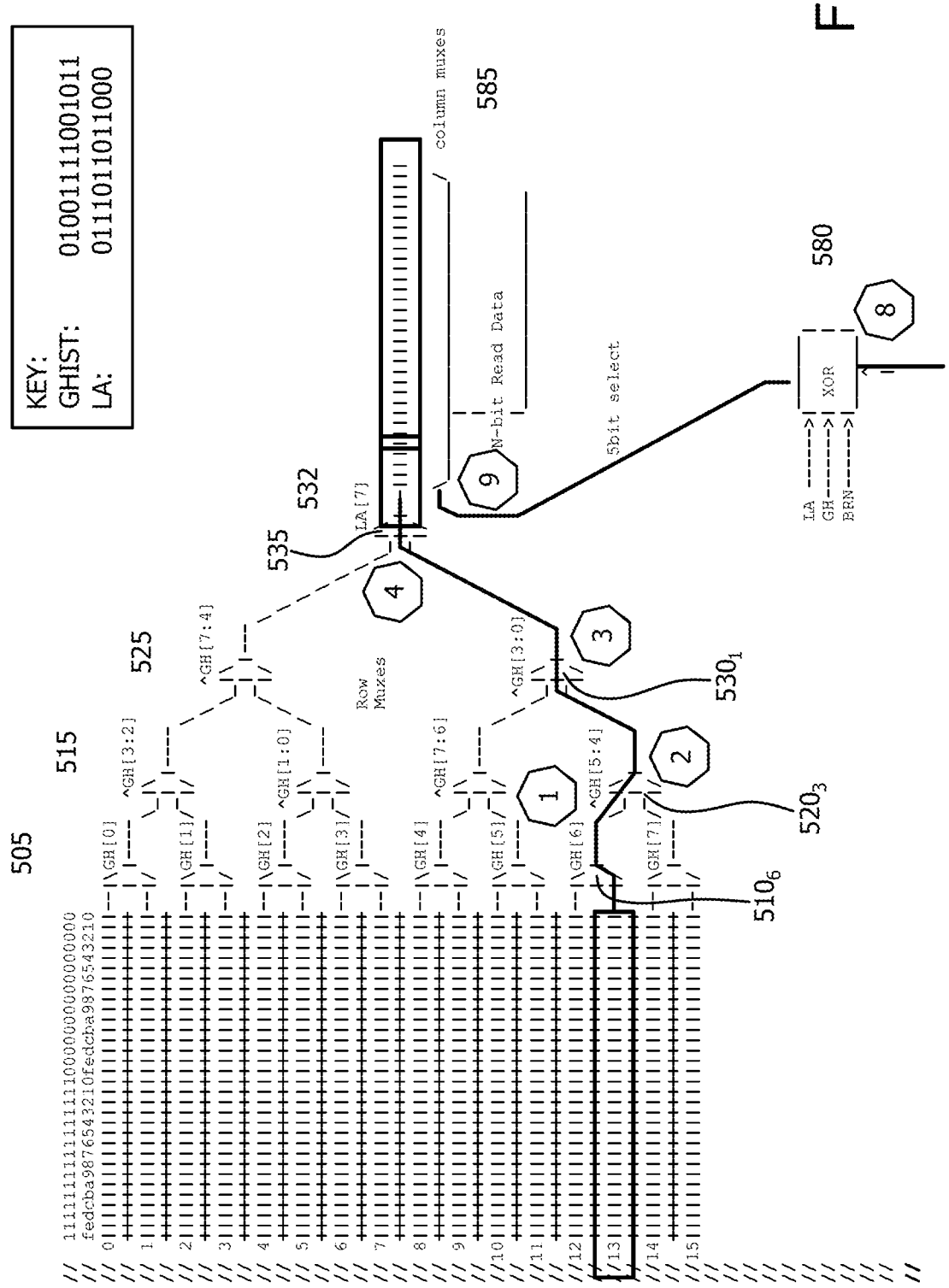
FIGS. 5A-5B are diagrams that illustrate a multiplexer tree indexing scheme which contains 16 rows and uses each select bit once in the first level, according to an example.
Figure 5B:
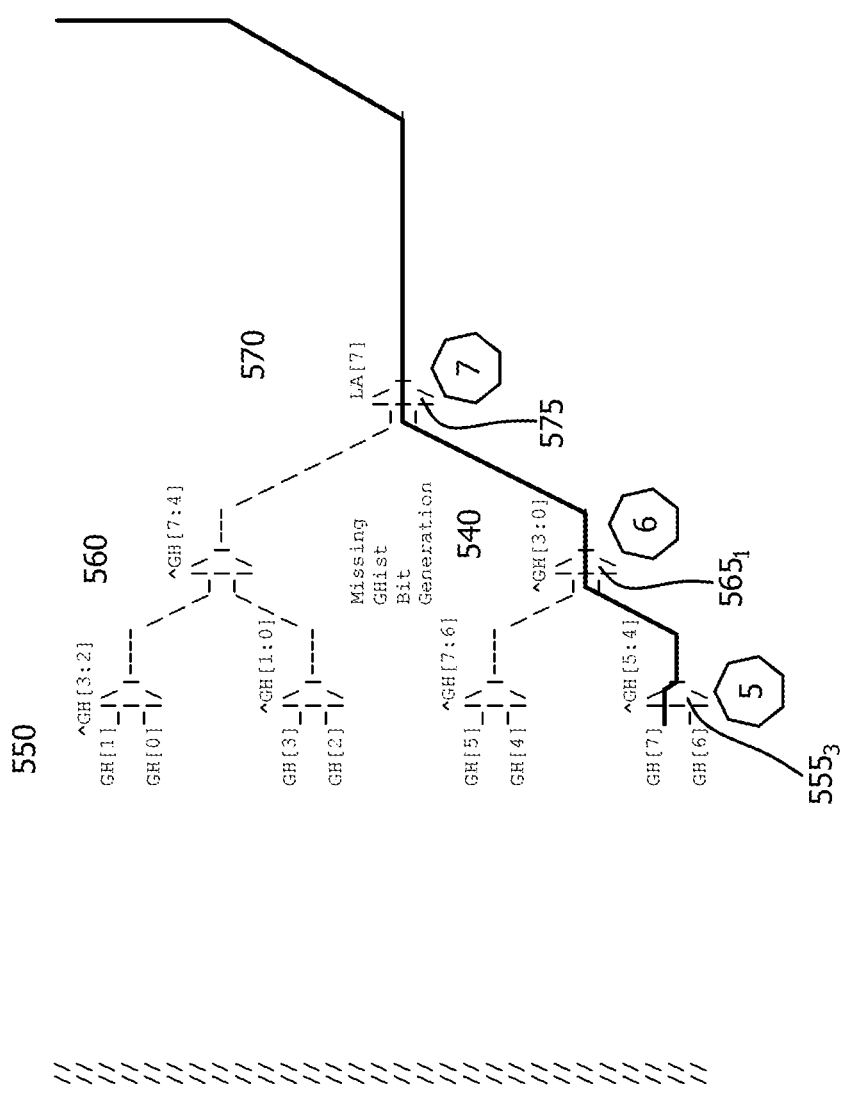
Figure 6:
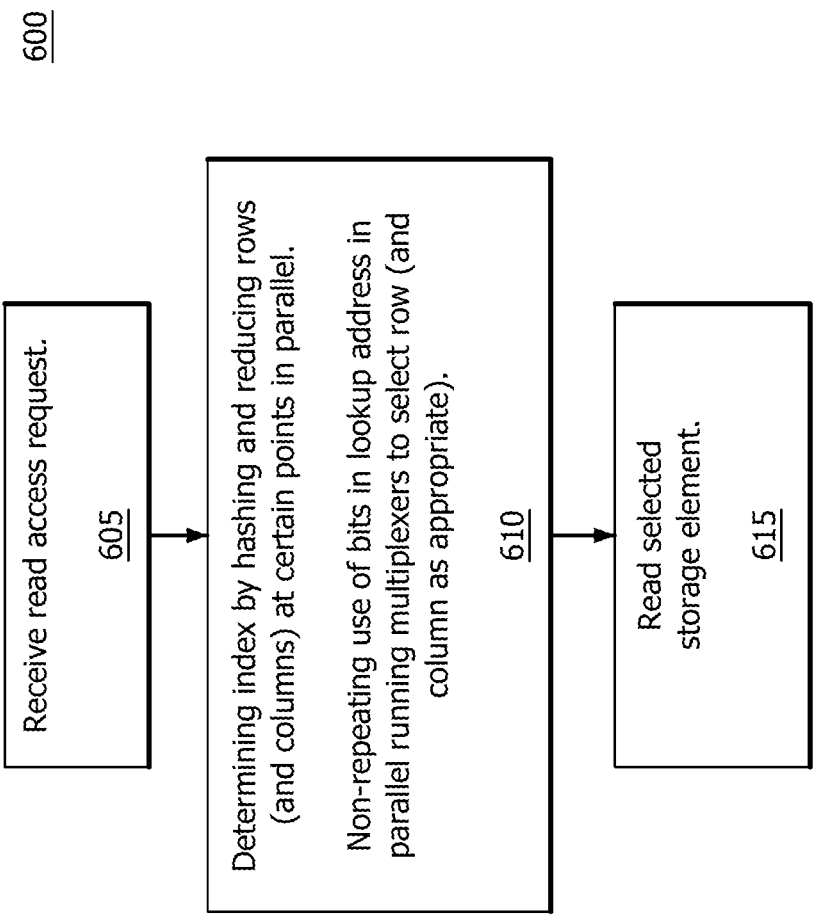
FIG. 6 is a flow diagram of a method for a read access of the multiplex tree of FIGS. 5A-5B in accordance with certain implementations.

FIGS. 5A-5B illustrate an example trace of a storage element selection and is explained operationally with respect to the flowchart 600 of FIG. 6. In this implementation, each of the 16 rows has 32 storage elements. In an implementation, each storage element can store a predetermined number of bits. As noted herein, each storage element requires a unique identifier to enable access to that storage element. In this illustrative example, the lookup address uses at least Ghist, linear address and branch number for the hashing index. For example, Ghist is equal to 01001111001011 and LA is equal to 0111011011000. Branch number is used to access two different elements at the same time. For example, in an implementation, there can be two column multiplexers. This enables parallel reads. The first element will use BRN=0, and the second element will use BRN=1. Both elements being read originate from the same row data, but can get a different column. Consequently, use of the branch number decreases the amount of row multiplexing logic in half as compared to if two full read ports were implemented.

Initially, a read request is received (605). Read data is generated by hashing and reducing rows and columns at certain points, e.g. points 1-9 in FIGS. 5A-5B, in parallel (610). In this example, if a mux select equals 1, the bottom or lower of the paired elements is selected and if a mux select equals 0, the top or upper of the paired elements is selected. Ghist bit 6 is used to select between rows 12 and 13 at point 1 (first level 505) using row multiplexer $510_6$. Ghist bit 6 equals 1 and therefore row 13 is selected. A hash of Ghist bits 4 and 5 is used to select between rows 13 and 15 at point 2 (second level 515) using row multiplexer $520_3$. The hash is an XOR of Ghist bits 4 and 5, which results in a 0 and therefore row 13 is selected. A hash of Ghist bits 0-3 is used to select between rows 13 and 10 at point 3 (third level 525) using row multiplexer $530_1$. The hash is an XOR of Ghist bits 0-3, which results in a 1 and therefore row 13 is selected. Linear Address (LA) bit 7 is used to select between row 13 and a top half of muxtree 500 at point 4 (fourth level 532) using row multiplexer 535. LA bit 7 equals 1 and therefore row 13 is selected.

Missing Ghist Bit Generation logic 540 generates the column mux select input in parallel when there are more than two storage elements in a row. For example, there are 32 storage elements in the FIG. 5A-5B illustration. Accordingly, a hash of Ghist bits 4 and 5 is used to select between Ghist bits 6 and 7 at point 5 (first level 550) using column multiplexer $555_3$. The hash is an XOR of Ghist bits 4 and 5, which results in a 0 and therefore Ghist bit 7 is selected. A hash of Ghist bits 0-3 is used to select between Ghist bits 4 and 7 at point 6 (second level 560) using column multiplexer $565_1$. The hash is an XOR of Ghist bits 0-3, which results in a 1 and therefore Ghist bit 7 is selected. LA bit 7 is used to select between Ghist bit 7 and a top half of Missing Ghist Bit Generation logic 540 of muxtree 500 at point 7 (third level 570) using column multiplexer 575. LA bit 7 equals 1 and therefore Ghist bit 7 is selected. The output of column multiplexer 575, Ghist bit 7, is input to XOR logic gate 580 along with LA bits 2-6 and 8-12, branch number (designating two different parallel column muxes), and Ghist bits 8-12, (to provide entropy). An XOR of these bits is performed to generate a 5 bit select input to column multiplexer 585 that acts as a column input select into the selected row. In this example, the 5 bit select accesses the 27th and 28th bit of selected row 13 (615).

Figure 7A:
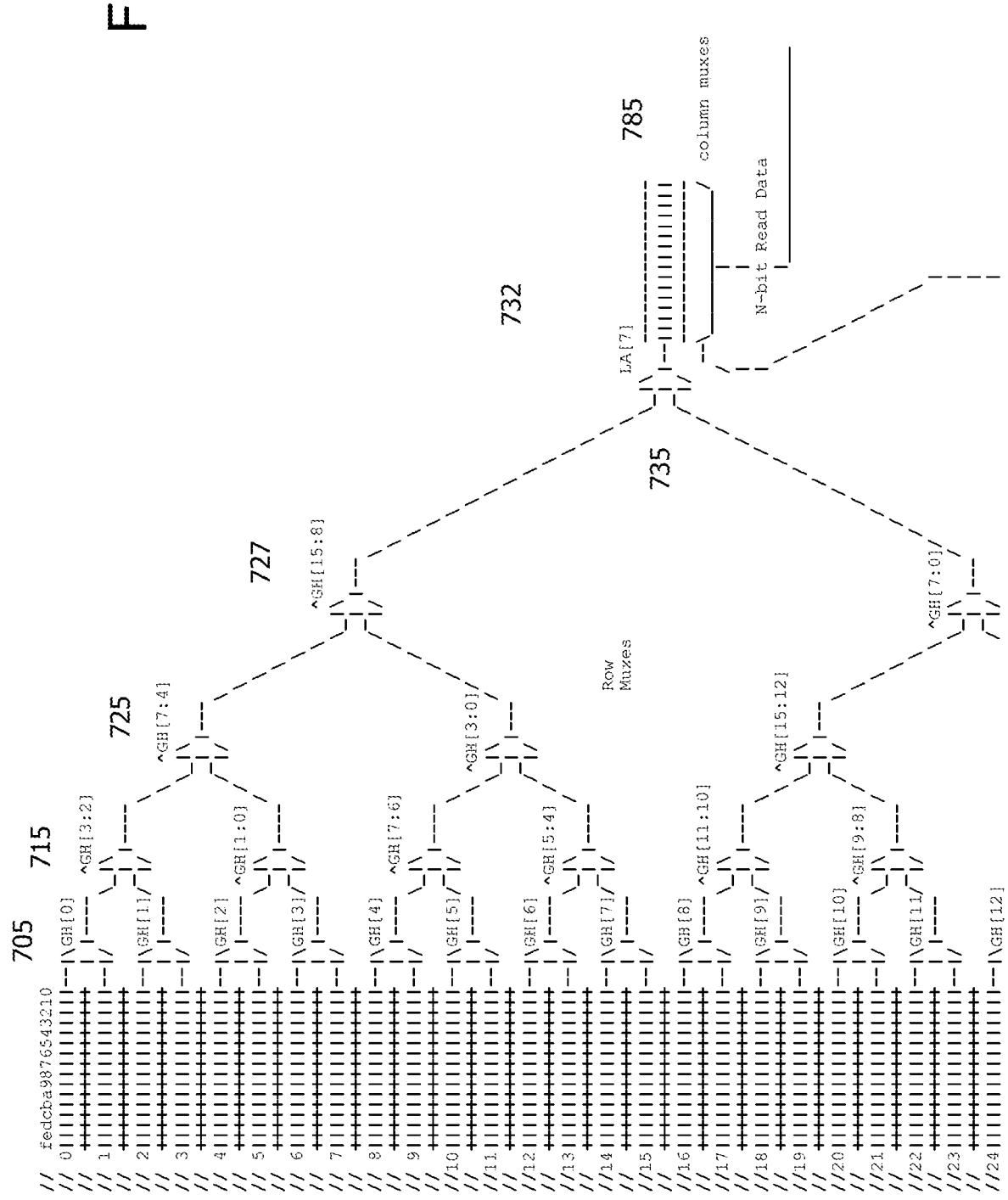
FIGS. 7A-7C are diagrams that illustrate a multiplexer tree indexing scheme which contains 32 rows and uses each select bit once in the first level of multiplexers in accordance with certain implementations.
Figure 7B:
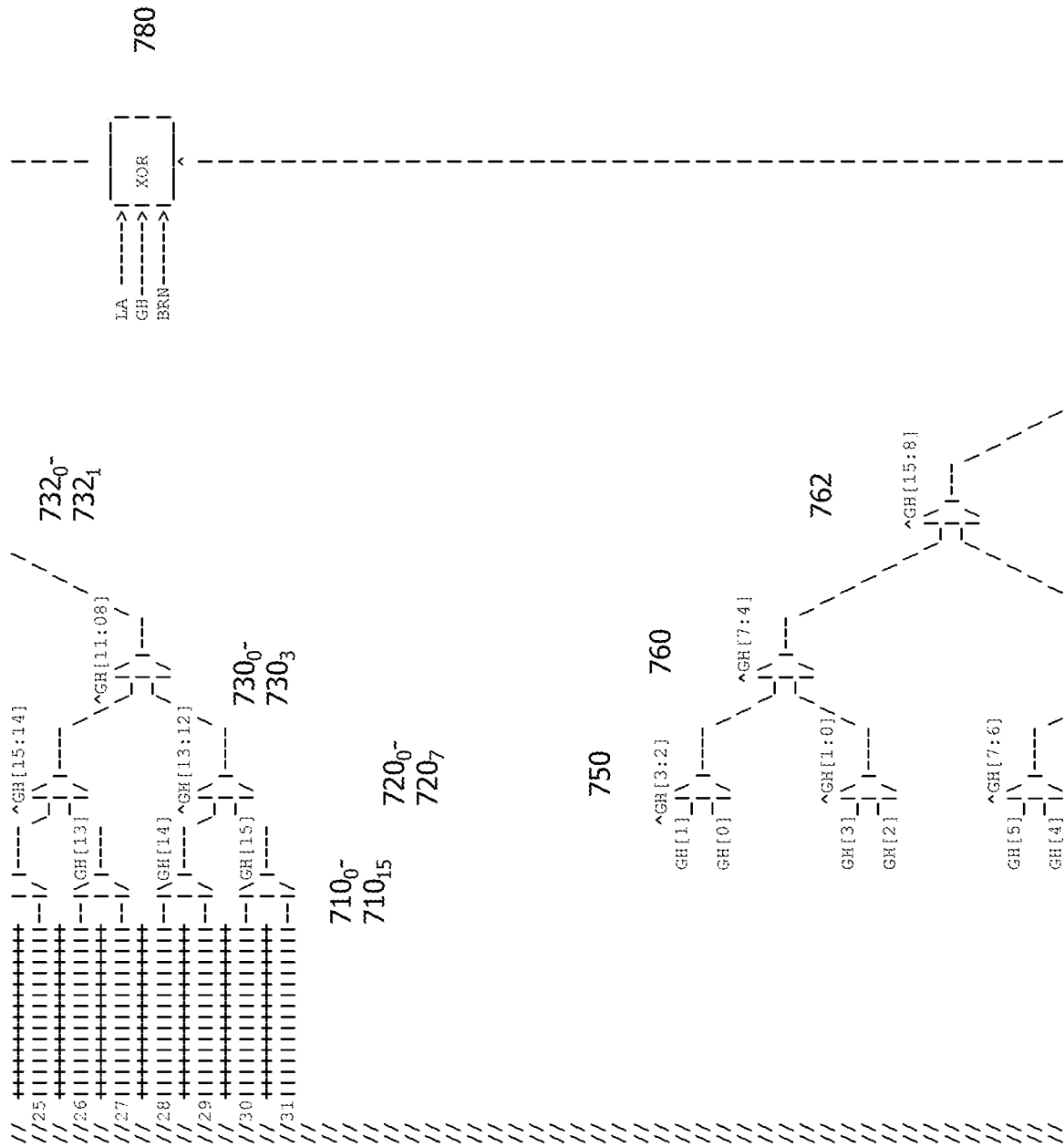
Figure 7C:
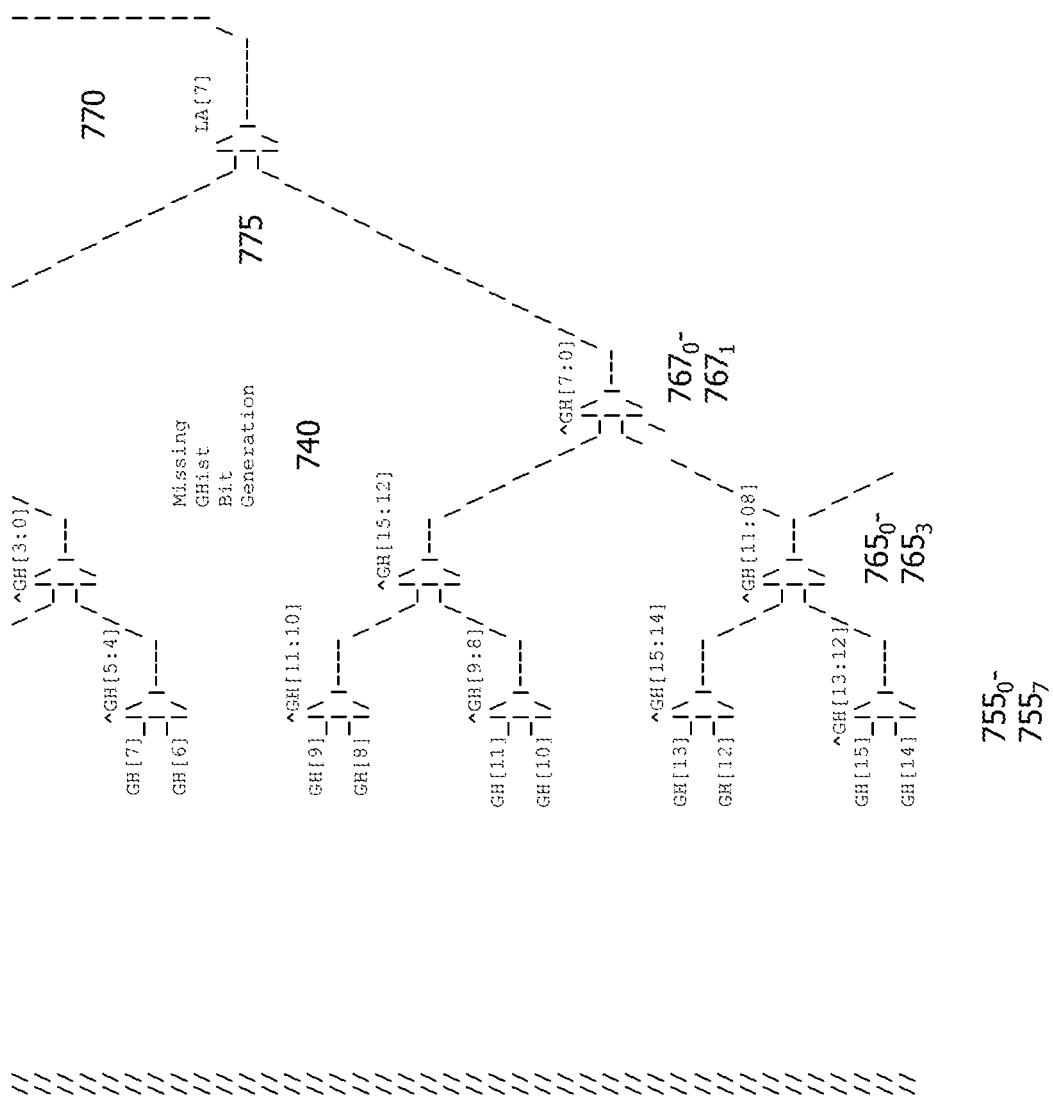

FIGS. 7A-7C are an example 32 row muxtree 700 which uses a combination of Ghist, a linear address (LA) and branch number as the lookup address. As noted herein, entropy in the lookup address ensures that all branches of muxtree 700 are used in a near random, distributive fashion. The number of inputs in FIGS. 7A-7C is illustrative.

In this implementation, each row has 16 storage elements. In an implementation, each row can have one storage element. The number of storage elements in a row determines the number of columns. In an implementation, each storage element can store a predetermined number of bits. As described herein, each storage element requires a unique identifier to enable access to that storage element. In this implementation, the first level of multiplexes is selected by a unique bit.

At a first level 705 of muxtree 700 there are 16 row multiplexers $710_0$-$710_{15}$ and each multiplexer $710_{0-15}$ uses a different selection bit from the lookup address. For example, each multiplexer $710_{0-15}$ can use a different Ghist bit, for example. Each multiplexer $710_{0-15}$ selects between a set of rows and therefore reduces the number of rows, which in turn decreases the fan-out. In general, the number of multiplexer levels needed depends on the number of reductions needed to select an appropriate storage element. The multiplexers can be implemented using logic or gates typically used to implement such multiplexers. In an implementation, AND-OR-Invert (AOI) gates are used to implement the multiplexers.

At a second level 715 of muxtree 700 there are 8 row multiplexers $720_0$-$720_7$ and each multiplexer $720_{0-7}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. Each multiplexer $720_{0-7}$ selects between an already reduced set of rows and again reduces the number of rows fed to the next level.

At a third level 725 of muxtree 700 there are 4 row multiplexers $730_0$-$730_3$ and each multiplexer $730_{0-3}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. Each multiplexer $730_{0-3}$ selects between an already reduced set of rows and again reduces the number of rows fed to the next level.

At a fourth level 727 of muxtree 700 there are 2 row multiplexers $732_0$-$732_1$ and each multiplexer $732_{0-1}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. Each multiplexer $732_{0-1}$ selects between an already reduced set of rows and again reduces the number of rows fed to the next level.

At a fifth level 732 of muxtree 700, a row multiplexer 735 uses a predetermined bit of LA to select the row. The predetermined bit is one that should toggle on a regular basis or quite often so that potential combinations of the remaining row appear to be selected on a random basis. If the predetermined bit is not selected properly, then only half the muxtree 700 structure will be used for indexing. The selection of the predetermined bit should optimize random usage of the entire muxtree 700 structure.

In this implementation, the number of levels of the row multiplexers is an odd number. If AOI gates are used in an implementation, the read data will be inverted since AOI gates produce inverted results. Final standalone inverter gates inserted in the datapath, such as after 730, can produce correct data row results and act as buffer gates, or alternatively, the data may be stored inverted in the data structure itself.

At this juncture in muxtree 700, a row has now been selected. An additional set of multiplexers and selection bits provide column input reduction and selection. For purposes of illustration only, this is referred to as Missing Ghist Bit Generation logic 740 since bits that were not used across a row are now used for column input selection. Missing Ghist Bit Generation logic 740 can include column multiplexers, where the number of levels depends on the number of reductions needed to select an appropriate storage element.

At a first level 750 of muxtree 700 there are 8 column multiplexers $755_0$-$755_7$ and each multiplexer $755_{0-7}$ uses as inputs Ghist bits which were not used in an associated row. Each multiplexer $755_{0-7}$ uses the hashed selection bits from the corresponding row multiplexer operation. Each multiplexer $755_{0-7}$ selects and reduces the number of Ghist bits fed to the next level.

At a second level 760 of muxtree 700 there are 4 column multiplexers $765_0$-$765_3$ and each multiplexer $765_{0-3}$ uses the hashed selection bits from the corresponding row multiplexer operation as before. Each multiplexer $765_{0-3}$ selects between an already reduced set of columns and again reduces the number of Ghist bits fed to the next level.

At a third level 762 of muxtree 700 there are 2 column multiplexers $767_0$-$767_1$ and each multiplexer $767_{0-1}$ uses the hashed selection bits from the corresponding row multiplexer operation as before. Each multiplexer $767_{0-1}$ selects between an already reduced set of columns and again reduces the number of Ghist bits fed to the next level.

At a fourth column level 770 of muxtree 400, a column multiplexer 775 uses the same predetermined bit of LA to select the column. In an implementation, a different predetermined bit can be used that also toggles on a regular basis or quite often so that potential combinations of the remaining column appear to be selected on a random basis.

In an implementation, the output of column multiplexer 775 is an input to a XOR logic gate 780 along with other inputs which could include, for example, LA, Ghist and branch number. These other inputs are included to provide variability in the index. For example, in line with the theme of not repeating bits, unused bits from the Ghist and LA can be used.

A predetermined number of bits from XOR logic gate 780 are output to a column multiplexer 785 that acts as a column input select into the previously selected row. This determines the particular storage element.

As a result of non-repeating use of the bits in the lookup address, row multiplexers $710_0$-$710_{15}$, row multiplexers $720_0$-$720_7$, row multiplexers $730_0$-$730_3$, row multiplexers $732_0$-$732_3$, row multiplexer 735, missing Ghist multiplexers $755_0$-$755_7$, missing Ghist multiplexers $765_0$-$765_3$, missing Ghist multiplexers $767_0$-$767_1$ and missing Ghist multiplexer 775 can perform hashing and reduction in parallel.

In an implementation, select bits may be used more than once in the same level, which will subsequently change the scheme of the rest of the levels of logic. This is described with respect to FIG. 8.

FIG. 8 is an example 16 row muxtree 800 which uses a combination of Ghist, a linear address (LA) and branch number as the lookup address as described herein. In this implementation, each row has 2 storage elements.

At a first level 805 of muxtree 800 there are 8 row multiplexers $810_0$-$810_7$ and each pair of multiplexers $810_{0-1}$, $810_{2-3}$, $810_{4-5}$, and $810_{6-7}$ uses a different selection bit from the lookup address. For example, each pair of multiplexers $810_{0-1}$, $810_{2-3}$, $810_{4-5}$, and $810_{6-7}$ can use a different Ghist bit, for example. Each multiplexer $810_{0-7}$ selects between a set of rows and therefore reduces the number of rows fed to the next level. In general, the number of multiplexer levels needed depends on the number of reductions needed to select an appropriate storage element. The multiplexers can be implemented using logic or gates typically used to implement such multiplexers. In an implementation, AND-OR-Invert (AOI) gates are used to implement the multiplexers.

At a second level 815 of muxtree 800 there are 4 row multiplexers $820_0$-$820_3$ and each multiplexer $820_{0-3}$ uses a range of available selection bits from the lookup address. In general, availability depends on whether a particular lookup address bit(s) has been used with respect to the rows that are under consideration. For example, row multiplexer $820_0$ uses Ghist bit 1. Each multiplexer $820_{0-3}$ selects between an already reduced set of rows and again reduces the number of rows fed to the next level.

At a third level 825 of muxtree 800 there are 2 row multiplexers $830_0$-$430_1$ and each multiplexer $830_{0-1}$ uses a range of available selection bits from the lookup address which are hashed together down to one selection bit. In general, availability depends on whether a particular lookup address bit(s) has been used with respect to the rows that are under consideration. The hash of the selection bits can be done using, for example, XOR gate(s), to reduce the number of selection bits to one selection bit. Each multiplexer $830_{0-1}$ selects between an already reduced set of rows and again reduces the number of rows fed to the next level.

At a fourth level 832 of muxtree 800, a row multiplexer 835 uses a predetermined bit of LA to select the row. The predetermined bit is one that should toggle on a regular basis or quite often so that potential combinations of the remaining row appear to be selected on a random basis. If the predetermined bit is not selected properly, then only half of muxtree 800 structure will be used for indexing. The selection of the predetermined bit should optimize random usage of the entire muxtree 800 structure. For example, if it is assumed that the LA covers a $2^{64}$ byte range, then bit 63 of the LA will not toggle as much as bit 7 of the LA.

At this juncture in muxtree 800, a row has now been selected. A predetermined number of bits from a XOR logic gate 880 are output to a column multiplexer 885 that acts as a column input select into the previously selected row. In an implementation, XOR logic gate 880 uses LA, Ghist and branch number as inputs as described herein. For example, in line with the theme of not repeating bits, unused bits from the Ghist and LA can be used. This determines the particular storage element.

As a result of mostly non-repeating use of the bits in the lookup address, row multiplexers $810_0$-$810_7$, row multiplexers $820_0$-$820_3$, and row multiplexers $830_0$-$830_1$ can perform select hashing and reduction in parallel.

In general, a method for accessing data stored as a table in a storage medium includes receiving, at a multiplexer tree, a read access request for the table, the read access request including at least a lookup address. The multiplexer tree determining an index into the table by running in parallel hashing and at least row reduction using the lookup address to select at least a row and accessing a selected storage element in the table based on the at least selected row. In an implementation, the multiplexer tree uses each address bit in the lookup address as a select bit only once in a particular path in the multiplexer tree. In an implementation, the multiplexer tree uses a predetermined number of bits in the lookup address on a non-repetitive basis with respect to traversing a particular path in the multiplexer tree. In an implementation, the multiplexer tree uses different address bits from the lookup address as select bits for each level in a particular path in the multiplexer tree. In an implementation, multiple address bits from the lookup address are hashed at certain levels of the multiplexer tree. In an implementation, where the determining includes column reduction using the lookup address. In an implementation, the address bits not used for row reduction are used as input bits for the column reduction. In an implementation, the hashed selection bits from a corresponding row reduction are used for the column reduction. In an implementation, the lookup address includes at least one of global history, linear address, physical address, thread identifier, page attributes, and a pointer.

In general, a system for accessing data stored as a table in a storage medium includes a processor, a storage medium and a multiplexer tree connected to the storage medium and the processor. The multiplexer tree including a plurality of row multiplexers and the multiplexer tree: receives a read access request from the processor to access the table, the read access request including at least a lookup address; determines an index into the table by running the plurality of row multiplexers in parallel with respect to hashing and row reduction using the lookup address to select a row; and accesses a selected storage element in the table based on the selected row. In an implementation, the multiplexer tree uses each address bit in the lookup address as a select bit only once in a particular path in the multiplexer tree. In an implementation, the multiplexer tree uses a predetermined number of bits in the lookup address on a non-repetitive basis with respect to traversing a particular path in the multiplexer tree. In an implementation, the multiplexer tree uses different address bits from the lookup address as select bits for each level in a particular path in the multiplexer tree. In an implementation, multiple address bits from the lookup address are hashed at certain levels of the multiplexer tree. In an implementation, the multiplexer tree further includes a plurality of column multiplexers which are also run in parallel with respect to hashing, row reduction and column reduction using the lookup address to select a column. In an implementation, the address bits not used for row reduction are used as input bits for the column reduction. In an implementation, the hashed selection bits from a corresponding row reduction are used for the column reduction. In an implementation, the lookup address includes at least one of global history, linear address, physical address, thread identifier, page attributes, and a pointer.

In general, a multiplexer tree includes a plurality of row multiplexers. The plurality of row multiplexers running in parallel with respect to hashing and row reduction and each row multiplexer using at least one bit from a lookup address in a non-repetitive manner with respect to a particular path in the multiplexer tree to select a row. The multiplexer tree also includes a column multiplexer. The column multiplexer uses at least a portion of the lookup address to select a column in the selected row. In an implementation, the multiplexer tree further includes a plurality of column multiplexers which are run in parallel with respect to hashing, row reduction and column reduction to select a column. In an implementation, the bits not used for row reduction are used as input bits for the column reduction and the hashed selection bits from a corresponding row reduction are used for the column reduction.

The techniques described herein improve table indexing in a system having a memory and a computer processor. More specifically, by performing hashing and row reduction in parallel by use of each select bit only once in a particular path of the muxtree, access speed to the storage or memory is increased.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing data stored as a table in a storage medium, the method comprising:
receiving, at a multiplexer tree, a read access request for the table, the read access request including at least a lookup address;
determining, by the multiplexer tree, an index into the table by performing-hashing and row reduction in parallel, wherein the row reduction uses at least one bit from the lookup address without repeating the use of the at least one bit with respect to traversing a particular path in the multiplexer tree to select at least one row; and
accessing a selected storage element in the table based on the selected at least one row, wherein the multiplexer tree uses each address bit in the lookup address as a select bit at least once in a particular path in the multiplexer tree.

2. The method of claim 1, wherein the at least one bit from the address lookup is a predetermined number of bits.

3. The method of claim 1, wherein the multiplexer tree uses different address bits from the lookup address as select bits for each level in a particular path in the multiplexer tree.

4. The method of claim 1, wherein multiple address bits from the lookup address are hashed at certain levels of the multiplexer tree.

5. The method of claim 1, wherein the determining, by the multiplexer tree, the index into the table includes performing column reduction using the lookup address.

6. The method of claim 5, wherein address bits not used for row reduction are used as input bits for the column reduction.

7. The method of claim 6, wherein hashed selection bits from a corresponding row reduction are used for the column reduction.

8. The method of claim 1, wherein the lookup address includes at least one of global history, linear address, physical address, thread identifier, page attributes, and a pointer.

9. A system for accessing data stored as a table in a storage medium, the system comprising:
   a processor;
   the storage medium; and
   a multiplexer tree connected to the storage medium and the processor, the multiplexer tree including a plurality of row multiplexers, wherein the multiplexer tree is configured to:
   receive a read access request from the processor to access the table, the read access request including at least a lookup address;
   determine an index into the table by performing hashing and row reduction in parallel, wherein the row reduction uses at least one bit from the lookup address without repeating the use of the at least one bit with respect to traversing a particular path in the multiplexer tree to select at least one row; and
   access a selected storage element in the table based on the selected at least one row,
   wherein the multiplexer tree uses each address bit in the lookup address as a select bit at least once in a particular path in the multiplexer tree.

10. The system of claim 9, wherein the at least one bit from the address lookup is a predetermined number of bits.

11. The system of claim 9, wherein the multiplexer tree uses different address bits from the lookup address as select bits for each level in a particular path in the multiplexer tree.

12. The system of claim 9, wherein multiple address bits from the lookup address are hashed at certain levels of the multiplexer tree.

13. The system of claim 9, wherein the multiplexer tree further includes one or more column multiplexers, wherein the one or more column multiplexers are configured to perform column reduction in parallel with the hashing and row reduction performed by the plurality of row multiplexers_using the lookup address to select a column.

14. The system of claim 13, wherein bits from the lookup address not used for row reduction are used as input bits for the column reduction.

15. The system of claim 14, wherein hashed selection bits from a corresponding row reduction are used for the column reduction.

16. The system of claim 9, wherein the lookup address includes at least one of global history, linear address, physical address, thread identifier, page attributes, and a pointer.

17. A multiplexer tree circuit comprising:
   circuitry configured to receive a read access request for data stored as a table in a storage medium, the read request including at least a lookup address;
   a plurality of row multiplexers, wherein the plurality of row multiplexers are configured to perform hashing and row reduction in parallel and each row multiplexer uses at least one bit from the lookup address without repeating the use of the at least one bit with respect to traversing a particular path in the multiplexer tree to select at least one row; and
   circuitry configured to access a selected storage element in the table based on the selected at least one row,
   wherein each address bit in the lookup address is used as a select bit at least once in a particular path in the multiplexer tree.

18. The multiplexer tree circuit of claim 17, further comprising one or more column multiplexers, wherein the one or more column multiplexers are configured to perform column reduction in parallel with the hashing and row reduction performed by the plurality of row multiplexers using the lookup address to select a column, wherein bits from the lookup address not used for row reduction are used as input bits for the column reduction, and wherein hashed selection bits from a corresponding row reduction are used for the column reduction.

* * * * *